United States Patent [19]

Takahashi

[11] Patent Number: 5,339,377

[45] Date of Patent: Aug. 16, 1994

[54] OPTICAL FIBER SPLICER FOR RIBBON-SHAPED OPTICAL FIBER CORDS

[75] Inventor: Mitsuo Takahashi, Matsudo, Japan

[73] Assignee: Seikoh Giken Co., Ltd., Matsudo, Japan

[21] Appl. No.: 60,524

[22] Filed: May 13, 1993

[30] Foreign Application Priority Data

Nov. 13, 1992 [JP] Japan .................. 4-328515

[51] Int. Cl.$^5$ ................................. K02B 6/38
[52] U.S. Cl. ................................. 385/98; 385/71; 385/137; 385/65
[58] Field of Search ............ 385/59, 60, 65, 66, 385/70–72, 83, 84, 97, 98, 93, 114, B7; 264/506; 156/556

[56] References Cited

U.S. PATENT DOCUMENTS

| | | | |
|---|---|---|---|
| 4,135,783 | 1/1979 | Kunze | 385/65 |
| 4,322,127 | 3/1982 | Comerford et al. | 385/65 |
| 5,155,787 | 10/1992 | Carpenter et al. | 385/98 |
| 5,236,541 | 8/1993 | Sugahara | 156/556 |
| 5,236,656 | 8/1993 | Nakajima | 264/506 |

*Primary Examiner*—Rodney B. Bovernick
*Assistant Examiner*—Phan Thi Heartney
*Attorney, Agent, or Firm*—Spencer, Frank & Schneider

[57] ABSTRACT

To connect one ribbon-shaped optical fiber cord to an opponent ribbon-shaped optical fiber cord while making reliable optical connection therebetween, an optical fiber splicer is used. The optical fiber splicer includes as essential components an aligning member and a cover member, and the cover member is fitted into the aligning member to build an integral structure without an optical fiber using an adhesive. In practical use, after the adhesive is hardened, both the ribbon-shaped optical fiber cords are inserted into the integral structure from both sides of the optical fiber splicer so that sheathless optical fibers of both ribbon-shaped optical fiber cords are firmly received in V-shaped aligning grooves on the aligning member in a face to-face relationship. When the optical fiber splicer is used as connector plugs for an optical connector, sheathless optical fibers of both ribbon-shaped optical fiber cords are integrally connected to each other by employing an electrical charging process, and thereafter, the sheathless optical fibers are received in the V-shaped aligning grooves of the aligning member. Subsequently, the cover member is fitted into the aligning member using an adhesive to build an optical fiber splicer which in turn is cut into two segments, i.e., a first connector plug and a second connector plug both of which can be used as essential components for an optical connector in a suitable manner.

16 Claims, 4 Drawing Sheets

FIG. 8 FIG. 7
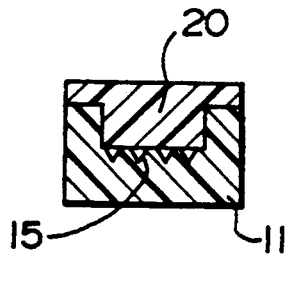
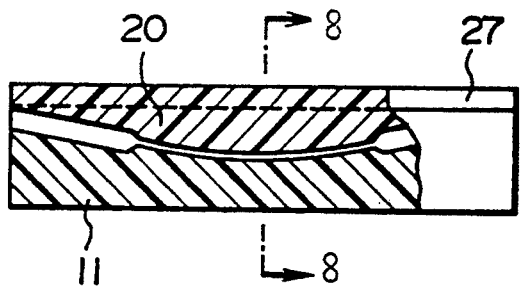
FIG. 9
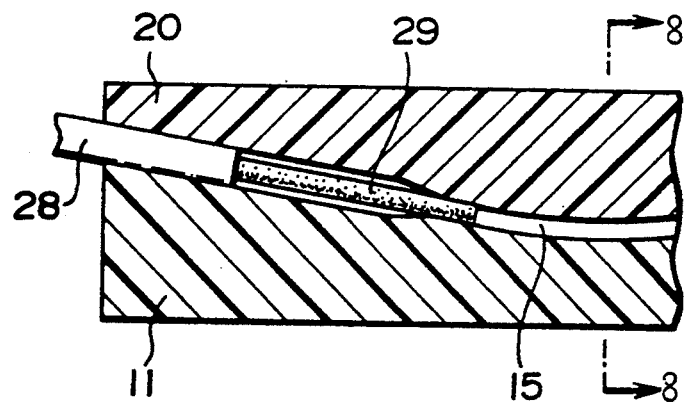
FIG. 10
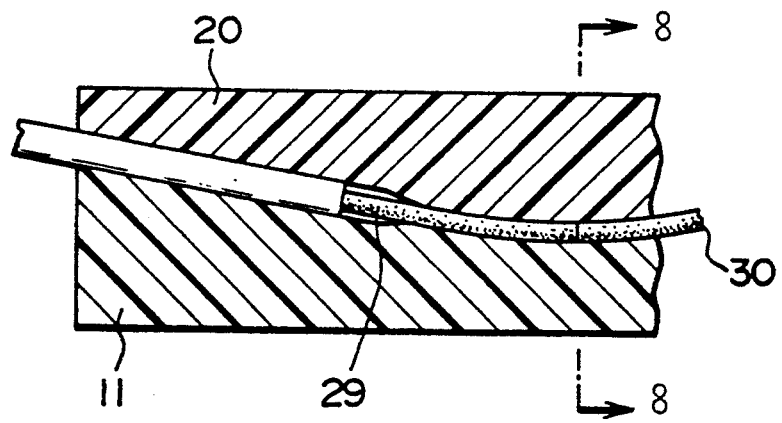

OPTICAL FIBER SPLICER FOR RIBBON-SHAPED OPTICAL FIBER CORDS

BACKGROUND OF THE INVENTION

The present invention relates generally to an optical fiber splicer for ribbon-shaped optical fiber cords which are widely used in an optical fiber communication circuit system. More particularly, the present invention relates to an optical fiber splicer of the foregoing type which can practically be used as an optical connector or an optical diverging/converging device.

To assure that a ribbon-shaped optical fiber cord composed of a plurality of optical fibers can be connected to an opponent ribbon-shaped optical fiber cord of the same type to make a reliable optical connection therebetween, an optical fiber splicer of the type including an aligning member and a cover member adapted to cooperate with the aligning member so as to allow sheathless optical fibers to be received in substantially V-shaped grooves formed on a flat working surface of the aligning member while extending in parallel with each other in the longitudinal direction when the aligning member and the cover member are assembled together has been developed and put in practical use.

To facilitate understanding of the present invention, a typical conventional optical fiber splicer of the foregoing type will be described below with reference to FIGS. 14 to 21.

FIG. 14 is a sectional view of a cover member 5, FIG. 16 is a sectional view of an aligning member 1 adapted to cooperate with the cover member 5 for firmly holding sheathless optical fibers 2 and 3 between the aligning member 1 and the cover member 5, and FIG. 18 is a sectional view of the conventional optical fiber splicer wherein the aligning member 1 is assembled with the cover member 5 while a plurality of sheathless optical fibers (four sheathless optical fibers in the illustrated case) 2 and 3 are firmly held between the aligning member 1 and the cover member 5. As is best seen in FIG. 21, four V-shaped optical fiber receiving grooves 4 are formed on a flat working surface of the aligning member 1 so that the sheathless optical fibers 2 and 3 are received in the grooves 4 in the longitudinal direction while extending in parallel with each other.

In addition, sheath receiving grooves 6 and 7 are formed on the aligning member 1 and the cover member 5 to receive sheaths 8 and 9 of ribbon-shaped optical fiber cords in the grooves 6 and 7.

In operation, the sheathless optical fibers 2 and 3 are first inserted into the optical fiber receiving grooves 4 from the opposite sides of the optical fiber splicer, and thereafter, the aligning member 1 and the cover member 5 are firmly assembled together in the presence of an adhesive coated on their flat working surfaces by the action of a compressing force imparted to the cover member 5 from above while the foremost end faces of the sheathless optical fibers 2 are brought in close contact with the foremost end faces of the opponent sheathless optical fibers 3 to make an optical connection therebetween.

With this construction, the outer peripheral surface of each of the sheathless optical fibers 2 and 3 comes in close contact with both the tapered surfaces of each V-shaped groove 4 in the form of a two-point contact, and a compressing force is then imparted to the cover member 5 from above so that the upper parts of the sheathless optical fibers 2 and 3 are compressed with a flat working surface of the cover member 5 by the action of the foregoing compressing force while the sheathless optical fibers 2 and 3 are correctly received in position in the V-shaped grooves 4. However, in case that the respective V-shaped grooves 4 are machined with some machining error or the respective sheathless optical fibers 2 and 3 are made with some fluctuation in outer diameter, there arises a malfunction that one or more sheathless optical fibers among the sheathless optical fibers 2 and 3 fail to come in contact with both the tapered surface of the V-shaped groove 4 or the flat working surface 10 of the cover member 5 as shown in FIG. 21.

For example, as shown in FIG. 21, sheathless optical fiber 2A does not come in contact with the right-hand tapered surface of the V-shaped groove 4, and the sheathless optical fibers 2C and 2D are unstably received in the V-shaped grooves 4.

Since the conventional optical fiber splicer is constructed in the above-described manner such that the sheathless optical fibers 2 are optically connected to the opponent sheathless optical fibers 3 with each V-shaped groove 4 as a reference, the aforementioned incorrect contact state is undesirable because there arises another malfunction that some of the sheathless optical fibers 2 are or will be positionally offset from the opponent optical fibers 3.

Incidentally, in case of single mode optical fibers, when a center axis of one optical fiber is positionally offset from that of the opponent optical fiber by a quantity of 1 $\mu$m, it is found that the connection loss which has arisen at this time amounts to about 0.2 dB.

When the sheathless fibers 2 and 3 are more intensely squeezed in the V-shaped grooves 4 with the cover member 5 by the action of an increased magnitude of compressing force imparted thereto from above so as to cope with the foregoing malfunction, a higher stress appears in each of the sheathless optical fibers 2 and 3, resulting in the insert loss being increased. In this connection, another problem is that reliability and durability of the optical connection made between the foremost end faces of both the sheathless optical fibers 2 and 3 may be degraded due to the high stress derived from the intense compressing force.

With the conventional optical fiber splicer, since the aligning member 1 and the cover member 5 are assembled together to build the integral structure using an adhesive, an assembling operation is unavoidably complicated and time-consuming. For this reason, it is practically difficult to perform such an assembling operation as mentioned above in the field under bad outdoor working conditions.

SUMMARY OF THE INVENTION

The present invention has been made in consideration of the aforementioned background.

An object of the present invention is to provide an optical fiber splicer for ribbon-shaped optical fiber cords wherein the foremost ends of sheathless optical fibers of a ribbon-shaped optical fiber cord can correctly be connected to the foremost end faces of sheathless optical fibers of an opponent ribbon-shaped optical fiber cord without positional offset to make a reliable optical connection therebetween with a small insert loss.

Another object of the present invention is to provide an optical fiber splicer for ribbon-shaped optical fiber cords wherein an assembling operation can easily be performed in the field, including an outdoor environment.

A further object of the present invention is to provide an optical fiber splicer for ribbon-shaped optical fiber cords wherein reliability and durability of the optical connection between both ribbon-shaped optical fiber cords is not degraded as time elapses.

A still further object of the present invention is to provide an optical fiber splicer usable as connector plugs for an optical connector for ribbon-shaped optical fiber cords wherein the connector plugs usable as essential components for the optical connector can easily be made based on a product of an optical fiber splicer.

According to one aspect of the present invention, there is provided an optical fiber splicer for ribbon-shaped optical fiber cords each including a plurality of optical fibers, wherein the optical fiber splicer comprises an aligning member for allowing sheathless optical fibers of a first ribbon-shaped optical fiber cord to be correctly aligned with sheathless optical fibers of a second ribbon-shaped optical fiber cord; the aligning member including inclined surfaces linearly extending from the opposite ends of the aligning member as seen in the longitudinal direction while having a gradually increased depth, sheath receiving portions recessed across the inclined surfaces for receiving sheaths of both the ribbon-shaped optical fiber cords therein, a concave surface located at the central part of the aligning member while extending subsequent to the inclined surfaces, a plurality of substantially V-shaped aligning grooves formed across the concave surface to receive sheathless optical fibers of both the ribbon-shaped optical fiber cords therein in such a manner as to allow the foremost end faces of the sheathless optical fibers of the first ribbon-shaped optical fiber cord to come in close contact with those of the sheathless optical fibers of the second ribbon-shaped optical fiber cord to make reliable optical connection therebetween, and side plates located on the opposite sides of the aligning member as seen in the transverse direction; a cover member adapted to be fitted into the aligning member for firmly holding the sheathless optical fibers of both the ribbon-shaped optical fiber cords in cooperation with the aligning member; the cover member including inclined surfaces linearly extending from the opposite ends of the cover member as seen in the longitudinal direction corresponding to the inclined surfaces of the aligning member while having a gradually increased height, sheath receiving portions recessed across the inclined surfaces corresponding to the sheath receiving portions of the aligning member for receiving the sheaths of both the ribbon-shaped optical fiber cords therein, a convex surface located at the central part of the cover member corresponding to the concave surface of the aligning member while extending subsequent to the inclined surfaces, and flanges located on the opposite sides of the cover member as seen in the transverse direction and adapted to come in contact with the side plates of the aligning member when the cover member is assembled with the aligning member; and the aligning member and the cover member being firmly assembled with each other with the aid of an adhesive which is coated on the upper surfaces of the side plate of the aligning member and/or the lower surfaces of the flanges of the cover member.

It is desirable that an inclination angle of each of the inclined surfaces of the aligning member and the cover member is set to ten degrees or less.

Usually, the aligning member and the cover member are molded of a synthetic resin by employing an injection molding process.

In operation, before both the ribbon-shaped optical fiber cords are inserted between the aligning member and the cover member from the opposite sides of the optical fiber splicer as seen in the longitudinal direction, each sheath of both the ribbon-shaped optical fiber cords, each sheathless optical fiber of the same and each substantially V-shaped aligning groove of the aligning member are preliminarily coated with an ultraviolet ray hardening type adhesive. This adhesive is hardened by irradiating ultraviolet rays toward the adhesive from an ultraviolet ray lamp after both the ribbon-shaped optical fiber cords are inserted between the aligning member and the cover member.

According to other aspect of the present invention, there is provided an optical fiber splicer usable as connector plugs for an optical connector for ribbon-shaped optical fiber cords each including a plurality of optical fibers, wherein the optical fiber splicer comprises a first connector plug including a first aligning member half and a first cover member half; the first aligning member half for allowing sheathless optical fibers of a first ribbon-shaped optical fiber cord to be correctly aligned with sheathless optical fibers of a second ribbon-shaped optical fiber cord and including an inclined surface linearly extending from the insert side of the first ribbon-shaped optical fiber cord while having a gradually increased depth, a sheath receiving portion recessed across the inclined surface for receiving a sheath of the first ribbon-shaped optical fiber cord therein, a concave surface half extending subsequent to the inclined surface to reach the exposed end of the aligning member half, a plurality of substantially V-shaped aligning grooves formed across the concave surface half for receiving the sheathless fibers of the first ribbon-shaped optical fiber cord therein such a manner as to allow the foremost end faces of the sheathless optical fibers of the first ribbon-shaped optical fiber cord to be exposed to the outside, and side plates located on the opposite sides of the first aligning member half as seen in the transverse direction; the first cover member half adapted to be fitted into the first aligning member half for firmly holding the sheathless optical fibers of the first ribbon-shaped optical fiber cord in cooperation with the first aligning member half and including an inclined surface linearly extending from the insert side of the first ribbon-shaped optical fiber cord corresponding to the inclined surface of the first aligning member half, a sheath receiving portion recessed across the inclined surface corresponding to the sheath receiving portion of the first aligning member half for receiving the sheath of the first ribbon-shaped optical fiber cord therein, a convex surface half formed subsequent to the inclined surface corresponding to the concave surface half of the first aligning member half to reach the exposed end of the first cover member half, and flanges located on the opposite sides of the first cover member half as seen in the transverse direction; the first assembling member half and the first cover member half being firmly assembled with each other with the aid of an adhesive which is coated on the upper surfaces of the side plates of the first aligning member half and/or the lower surfaces of the flanges of the first cover member half; a second connector plug including a second aligning member half and a second cover member half; the second aligning member half for allowing sheathless optical fibers of the second ribbon-shaped optical fiber cord to be correctly aligned with the sheathless optical fibers of the first ribbon-shaped optical fiber cord and including an inclined surface linearly extending from the insert end of the second ribbon-shaped optical fiber cord while having a gradually increased depth, a sheath receiving portion recessed across the inclined surface for receiving a sheath of the second ribbon-shaped optical fiber cord therein, a concave surface half extending subsequent to the inclined surface to reach the exposed end of the second aligning member half, a plurality of substantially V-shaped aligning grooves formed across the concave surface half for receiving the sheathless optical fibers of the second ribbon-shaped optical fiber cord therein in such a manner as to allow the foremost end faces of the sheathless optical fibers of the second ribbon-shaped optical fiber cord to be exposed to the outside, and side plates located on the opposite sides of the second aligning member half as seen in the transverse direction; the second cover member half adapted to be fitted into the second aligning member half for firmly holding the sheathless optical fibers of the second ribbon-shaped optical fiber cord in cooperation with the second aligning member half and including an inclined surface linearly extending from the insert end of the second ribbon-shaped optical fiber cord corresponding to the inclined surface of the second aligning member half, a sheath receiving portion formed across the inclined surface corresponding to the sheath receiving portion of the second aligning member half for receiving the sheath of the second ribbon-shaped optical fiber cord therein, a convex surface half formed subsequent to the inclined surface corresponding to the concave surface half of the second aligning member half to reach the exposed end of the second cover member half, and flanges located on the opposite sides of the second cover member half as seen in the transverse direction; and the second aligning member half and the second cover member half being firmly assembled with each other with the aid of an adhesive which is coated on the upper surfaces of the side plates of the second aligning member half and/or the lower surfaces of the flanges of the second cover member half.

In operation, before the sheathless optical fibers of both the ribbon-shaped optical fiber cords are received in the substantially V-shaped aligning grooves, the foremost end faces of the sheathless optical fibers of both the ribbon-shaped optical fiber cords are integrally connected to each other by fusing them by employing an electrical discharging process. In addition, before the sheathless optical fibers of both the ribbon-shaped optical fibers are received in the substantially V-shaped aligning grooves, each sheath of both the ribbon-shaped optical fiber cords, each sheathless optical fiber of the same and each substantially V-shaped aligning groove of the first and second aligning member halves are preliminarily coated with an ultraviolet ray hardening type adhesive.

After both the ribbon-shaped optical fiber cords are held between the first and second aligning member halves and the first and second cover halves, the ultraviolet ray hardening type adhesive is hardened by irradiating ultraviolet rays toward the adhesive from an ultraviolet ray lamp. Subsequently, after the adhesive is hardened, a product of optical fiber splicer is cut into two segments at the central part thereof at a substantially right angle relative to an optical axis of the optical fiber splicer wherein one of the segments is used as a first connector plug and the other one is used as a second connector plug. Alternatively, a product of optical fiber splicer may be cut into two segments at the central part thereof at a predetermined inclination angle relative to the optical axis of the optical fiber splicer wherein one of the segments is used as a first connector plug and the other one is used as a second connector plug. In this case, it is desirable that the inclination angle is set to eight degrees or less.

Other objects, features and advantages of the present invention will become apparent from reading of the following description which has been made in conjunction with the accompanying drawings.

BRIEF DESCRIPTION OF THE DRAWINGS

The present invention is illustrated in the following drawings in which:

FIG. 7 is a sectional view of an integral structure for the optical fiber splicer wherein the cover member is fitted into the aligning member without any optical fiber;

FIG. 8 is a cross-sectional view of the integral structure taken along line 8—8 in FIG. 7;

FIG. 9 is a fragmentary sectional view of the optical fiber splicer wherein sheathless optical fibers of a ribbon-shaped optical fiber cord are partially inserted into V-shaped aligning grooves;

FIG. 10 is a fragmentary sectional view of the optical fiber splicer wherein the sheathless optical fibers of the ribbon-shaped optical fiber cord are fully inserted into the V-shaped aligning grooves while they come in close contact with those of an opponent ribbon-shaped optical fiber;

DESCRIPTION OF THE PREFERRED EMBODIMENTS

The present invention will be described in detail hereinafter with reference to the accompanying drawings which illustrates a few preferred embodiments thereof.

Figure 2:
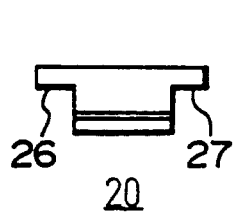
FIG. 2 is a front view of the cover member as seen from the left-hand side as seen in FIG. 1.
Figure 1:
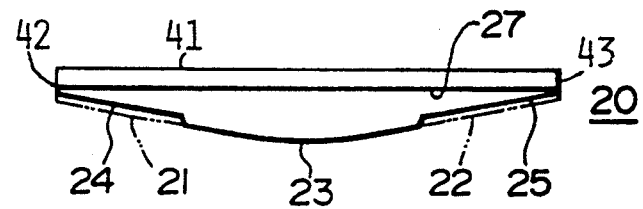
FIG. 1 is a side view of a cover member for an optical fiber splicer for ribbon-shaped optical fiber cords constructed according to a first embodiment of the present invention.
Figure 3:
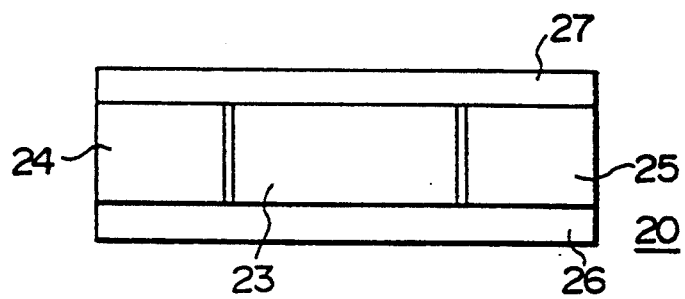
FIG. 3 is a bottom view of the cover member shown in FIG. 1.
Figure 4:
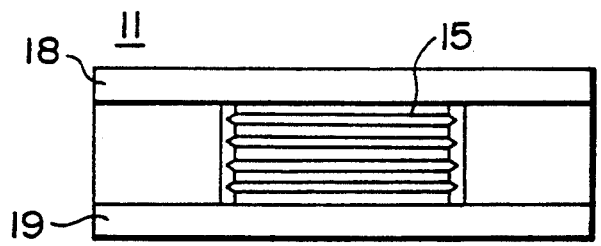
FIG. 4 is a plan view of an aligning member for the optical fiber splicer.
Figure 6:
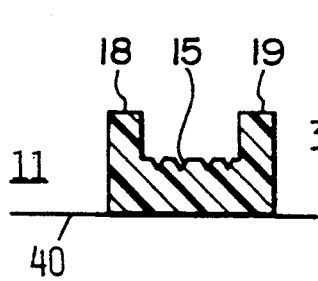
FIG. 6 is a cross-sectional view of the aligning member taken along line 6—6 in FIG. 5.
Figure 5:
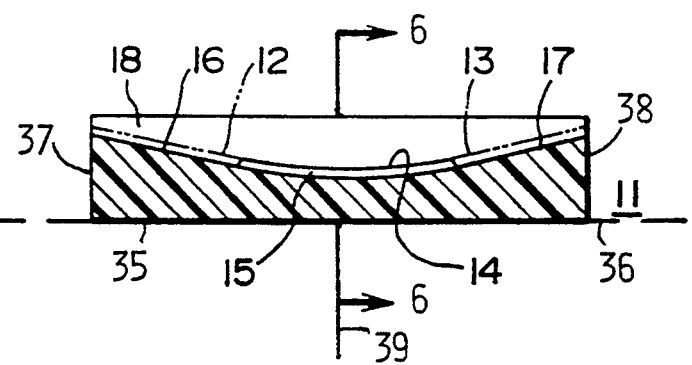
FIG. 5 is a sectional view of the aligning member shown in FIG. 4.

Essential components, i.e., a cover member 20 and an aligning member 11 constituting an optical fiber splicer for ribbon-shaped optical fiber cords constructed according to a first embodiment of the present invention are shown in FIG. 1 to FIG. 6. Specifically, FIG. 1 is a side view of the cover member 20, FIG. 2 is a front view of the cover member 20, and FIG. 3 is a bottom view of the cover member 20. FIG. 4 is a plan view of the aligning member 11, FIG. 5 is a sectional side view of the aligning member 11, and FIG. 6 is a cross-sectional view of the aligning member 11 taken along line 6—6 in FIG. 5. Each of the aligning member 11 and the cover member 20 as shown in these drawings is molded of a synthetic resin in an injection molding die (not shown) by employing an injection molding process. The aligning member 11 and the cover member 20 are assembled with each other to build an optical fiber splicer using an adhesive. In practice, it is recommended that the aligning member 11 and the cover member 20 be firmly assembled together using an adhesive before shipment of the optical fiber splicer product from the production line of a factory.

As is best seen in FIG. 5, the aligning member 11 includes a base surface 35 and end portions 37 and 38. Linearly extending inclined surfaces 12 and 13 extend from a central axis 39 toward the end portions 37 and 38, each having an inclination angle of ten degrees or less on the opposite sides of the aligning member 11 with respect to a longitudinal axis 36 and a concave surface 14 at the central part thereof. As shown in FIG. 6, a plurality of aligning grooves 15 (four aligning grooves in this example) are formed across the concave portion 14 in the direction of a transverse axis 40 so as to allow sheathless optical fibers to be received therein, and sheath receiving portions 16 and 17 are formed adjacent to the aligning grooves 15 across the linearly extending inclined surfaces 12 and 13 so as to allow sheaths of the ribbon-shaped optical fiber cords to be received therein when the ribbon-shaped optical fiber cords are inserted into the sheath receiving portions 16 and 17 from the opposite sides of the optical fiber splicer. In addition, the aligning member 11 includes side plates 18 and 19 on the opposite sides of the aligning member 11 as seen in the direction of the transverse axis 40 so that flanges 26 and 27 of the cover member 20 are brought into contact with the upper surfaces of the side plates 18 and 19 when the aligning member 11 and the cover member 20 are assembled together.

Next, the cover member 20 to be assembled with the aligning member 11 will be described in detail.

Specifically, the cover member 20 includes a top surface 41 and end portions 42 and 43. Linearly extending inclined surfaces 21 and 22 (represented by phantom lines in FIG. 1) extend from the central axis 39 toward the end portions 42 and 43, each having the same inclination angle as that of the linearly extending surfaces 12 and 13 of the aligning member 11 on both sides of the cover member 20 as seen in the longitudinal direction corresponding to the linearly extending inclined surfaces 12 and 13 of the aligning member 11 and a convex surface 23 at the central part of the cover member 11 corresponding to the concave surface 14 of the cover member 11. The radius of curvature of the convex surface 23 is coincident with that of the concave surface 14 of the aligning member 11. Sheath receiving portions 24 and 25 are formed adjacent to the convex surface 23 across the linearly extending surfaces 21 and 22 corresponding to the sheath receiving portions 16 and 17 of the aligning member 11 so as to allow the sheaths of the ribbon-shaped optical fiber cords to be received therein. In addition, the cover member 20 includes flanges 26 and 27 on both sides of the cover member 20 as seen in the transverse direction so that the flanges 26 and 27 are brought in contact with the upper surfaces of the side plates 18 and 19 of the aligning member 11 when the cover member 20 and the aligning member 11 are assembled with each other. Usually, the upper surfaces of the side plates 18 and 19 and/or the lower surface of the flanges 26 and 27 are coated with an adhesive for the purpose of reliably assembling the aligning member 11 with the cover member 20.

FIG. 7 is a sectional view of an integral structure for the optical fiber splicer which is built when the cover member 20 and the aligning member 11 are assembled with each other by fitting the cover member 20 into the cavity of the aligning member 11 defined by the side plates 18 and 19, and FIG. 8 is a cross-sectional view of the integral structure taken along line 8—8' in FIG. 7. As shown in the drawings, no optical fiber is inserted into the integral structure at this time.

Next, a process of inserting sheathless optical fibers 29 and 30 into the V-shaped aligning grooves 15 of the aligning member 11 will be described in detail with reference to FIGS. 9 to 12.

FIG. 9 is a fragmentary sectional view of the optical fiber splicer, particularly showing that the sheathless optical fibers 29 are partially inserted into the V-shaped aligning grooves 15 of the aligning member 11 from the left-hand side of the optical fiber splicer. Before the sheathless optical fibers 29 are inserted into the V-shaped aligning grooves 15, a sheath 28, respective sheathless optical fibers 29 and respective V-shaped aligning grooves 15 are preliminarily coated with an ultraviolet ray hardening type adhesive having the same refractive index as that of each sheathless optical fiber 29. Thus, FIG. 9 shows by way of a fragmentary sectional view that the foremost ends of the sheathless optical fibers 29 reach the V-shaped aligning grooves 15 and they are then partially inserted into the same. In the case of ribbon-shaped optical fiber cords, each composed of a plurality of optical fibers extending in parallel with each other in a closely spaced relationship, an important thing which should be taken into account during inserting of the sheathless optical fibers 29 in contrast with the case of a single core optical fiber is that respective sheathless optical fibers 29 should not be brought into contact with the surface of the sheath receiving portion 16 of the aligning member 11 and the surface of the sheath receiving portion 24 of the cover member 20 in the course of the inserting operation. If the foregoing contact occurs, there arises a malfunction whereby the sheathless optical fibers 29 are irregularly bent or they are randomly entangled with each other with the result that they can not correctly be inserted into the V-shaped aligning grooves 15 or they are cut or broken before they are inserted into the V-shaped aligning grooves 15. In consideration of the foregoing malfunction, the surface of the sheath receiving portion 16 of the aligning member 11 and the surface of the sheath receiving portion 24 of the cover member 20 are designed to linearly extend in parallel with each other so that only the sheath 28 moves linearly during the inserting operation while coming in contact with the surfaces of both the sheath receiving portions 16 and 24. With this construction, the sheathless optical fibers 29 can be inserted into the V-shaped aligning grooves 15 without any contact with the surfaces of both the sheath receiving portions 16 and 24 while extending in parallel with the foregoing surfaces in the spaced relationship relative to the same, as shown in FIG. 9.

FIG. 10 shows by way of a fragmentary sectional view that the sheathless optical fibers 29 are fully inserted into the V-shaped aligning grooves 15 to reach the central plane represented by the line 8—8 where the foremost end faces of the sheathless optical fibers 29 are brought into close contact with those of the opponent sheathless optical fibers 30 inserted in the opposite direction. At this time, the outer peripheral surface of each of the sheathless optical fibers 29 and 30 is inserted into the V-shaped aligning groove 15 while it comes in contact with the convex surface 23 of the cover member 20 and it is thrust against both tapered surfaces of the V-shaped aligning groove 15 by the action of the bending stress arising in each sheathless optical fiber. For this reason, in contrast with the conventional optical fiber splicer, the optical fiber splicer does not require a cover member of the type serving also as compressing means for forcibly positioning sheathless optical fibers in alignment with corresponding V-shaped aligning grooves. At this time, each sheathless optical fiber 29 is held in the corresponding V-shaped aligning groove 15 while it is thrust against both tapered surfaces of the V-shaped aligning groove 15 by the action of the bending stress arising in the sheathless optical fiber 29 itself. Thus, each V-shaped aligning groove 15 can be dimensioned to have a depth so as to assure that each sheathless optical fiber 29 is firmly held in the corresponding V-shaped aligning groove 15 without contact with the convex surface 23 of the cover member 20.

It should be noted that in this embodiment, the convex surface 23 of the cover member 20 serves as a guiding surface for smoothly inserting the sheathless optical fibers 29 and 30 into the V-shaped aligning grooves 15 with a certain radius of curvature. In this connection, an important thing which should be taken into account in this embodiment is that the radius of curvature of each bent sheathless optical fiber is preferably to be set to at least 30 mm, because if the radius of curvature is extremely small, there is a possibility that each bent sheathless optical fiber will as time elapses be adversely affected by the very small radius of curvature.

After the foremost end faces of the sheathless optical fibers 29 are brought in close contact with those of the opponent sheathless optical fibers 30 to make an optical connection therebetween, the adhesive coated on the sheath 28, the sheathless optical fibers 29 and 30 and the V-shaped aligning grooves 15 is hardened by irradiating ultraviolet rays toward the adhesive from an ultraviolet ray lamp (not shown).

Figure 11:
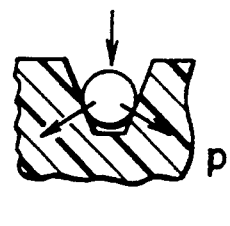
FIG. 11 is an enlarged fragmentary cross-sectional view of the optical fiber splicer, particularly showing that a sheathless optical fiber is thrust against both tapered surfaces of a V-shaped aligning groove with a compressing force P.
Figure 12:
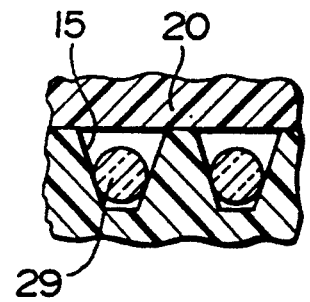
FIG. 12 is an enlarged fragmentary cross-sectional view of the optical fiber splicer, particularly showing that sheathless optical fibers are correctly received in position in the corresponding V-shaped aligning grooves without any contact with the cover member.

FIGS. 11 and 12 show the positional relationship between each sheathless optical fiber and a corresponding V-shaped aligning groove. As mentioned above, the sheathless optical fibers 29 and 30 are thrust against both tapered surfaces of each V-shaped aligning groove 15 by the action of a restorative force derived from the bending stress arising in each sheathless optical fiber.

As shown in FIG. 11, a contact pressure P corresponding to the bending stress of each sheathless optical fiber appears between each sheathless optical fiber 29 or 30 and the corresponding V-shaped aligning groove 15. In case the radius of curvature of each V-shaped groove is set to 30 mm and each sheathless optical fiber has a diameter of 0.125 mm, it is found, based on the values derived from practical measurement, that the contact pressure P is within the range of 1 to 3 grams for each sheathless optical fiber.

With the optical fiber splicer constructed in the above-described manner, the sheathless optical fibers 29 and 30 can correctly be inserted into the V-shaped aligning grooves 15 formed along the concave surface 14 of the aligning member 11 without any contact with the surface of each of the sheath receiving portions 16 and 17 of the aligning member 11 and the surface of each of the sheath receiving portion 24 and 25 of the cover member 20, since the optical fiber splicer includes linearly extending inclined surfaces 12 and 13 on the aligning member 11 side and linearly extending inclined surfaces 21 and 22 on the cover member 20 side each of which serves as a guiding surface for each sheath.

In addition, since each sheathless optical fiber is firmly held in position in the corresponding V-shaped groove while it is thrust against both tapered surfaces of the V-shaped aligning groove by the action of the bending stress arising in the bent sheathless optical fiber itself, in contrast with the conventional optical fiber splicer, there is no need for forcibly bringing each sheathless optical fiber in close contact with both tapered surfaces of the V-shaped aligning groove with the aid of a cover member of the type used for generating a thrusting force to be imparted to each sheathless optical fiber.

Figure 13:
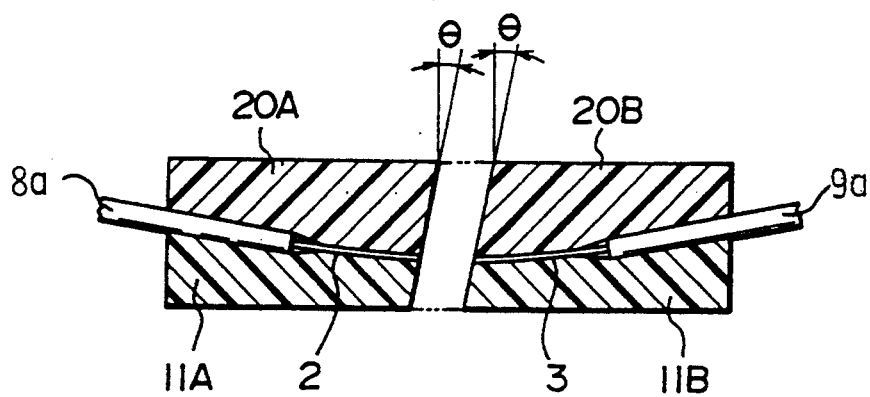
FIG. 13 is a sectional view of an optical fiber splicer constructed according to a second embodiment of the present invention wherein the optical fiber splicer is cut into two segments each serving as a connector plug for an optical connector.
Figure 15:
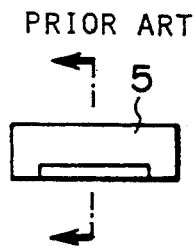
FIG. 15 is a front view of the cover member as seen from the left-hand side in FIG. 14.
Figure 14:
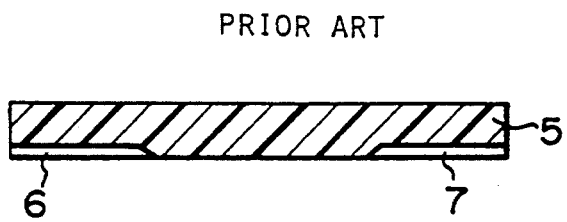
FIG. 14 is a sectional view of a cover member for a conventional optical fiber splicer.
Figure 17:
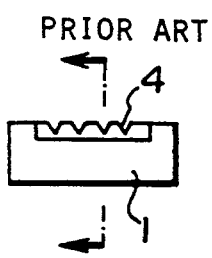
FIG. 17 is a front view of the aligning member as seen from the left-hand side in FIG. 16.
Figure 16:
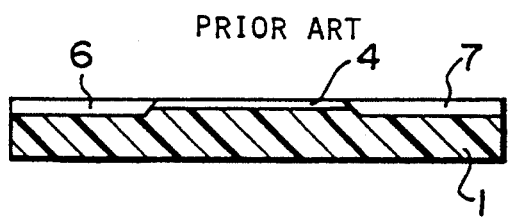
FIG. 16 is a sectional view of an aligning member for the conventional optical fiber splicer.
Figure 19:
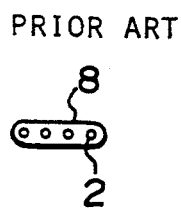
FIG. 19 is a front view of the conventional ribbon-type optical fiber, particularly showing the left-hand optical fiber cord.
Figure 18:
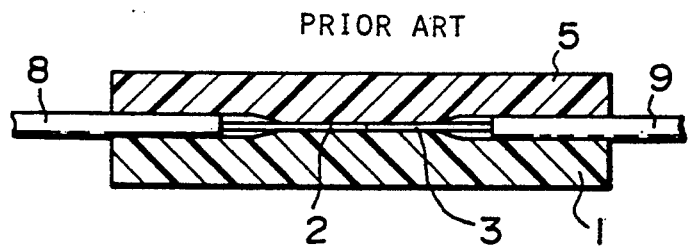
FIG. 18 is a sectional view of the conventional optical fiber splicer, particularly showing that the foremost end faces of sheathless optical fibers of a ribbon-shaped optical fiber cord come in close contact with those of sheathless optical fibers of an opponent ribbon-shaped optical fiber cord.
Figure 20:
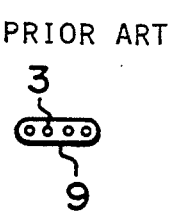
FIG. 20 is a front view of the conventional ribbon-type optical fiber, particularly showing the right-hand optical fiber cord.
Figure 21:
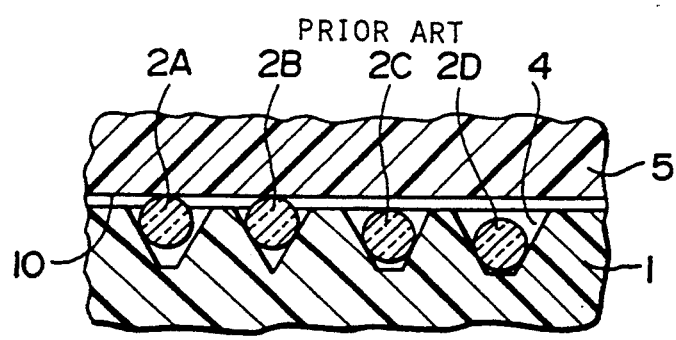
FIG. 21 is an enlarged fragmentary cross-sectional view of the conventional optical fiber cord, particularly showing that sheathless optical fibers are unstably held in the corresponding V-shaped aligning grooves.

FIG. 13 is a sectional view of an optical fiber splicer constructed according to a second embodiment of the present invention wherein the optical fiber splicer can be used as connector plugs for an optical connector for ribbon-shaped optical fiber cords.

In this embodiment, the foremost end faces of sheathless optical fibers 2 of one ribbon-shaped optical fiber cord 8a are first brought in contact with those of sheathless optical fibers 3 of an opponent ribbon-shaped optical fiber cord 9a. Next, the foremost end faces of the respective sheathless optical fibers 2 and 3 which have been brought in contact with each other are integrally connected to each other by fusing them by employing an electrical discharging process. Subsequently, the sheathless optical fibers 2 are correctly aligned with the sheathless optical fibers 3 with the aid of a combination of aligning members 11A and 11B with cover members 20A and 20B, i.e., an optical fiber splicer substantially constructed according to the preceding embodiment of the present invention, and thereafter, the aligning members 11A, 11B and cover members 20A, 20B are assembled with each other using an adhesive. Then, an assembly consisting of the aligning members 11A; 11B and cover members 20A, 20B is cut into two segments at the central position thereof with a substantially right angle relative to an optical axis of the assembly. Each of the resultant two segments can be used as a connector plug for an optical fiber connector.

In the illustrated case, to reduce the reflection return loss arising at a connection point, the assembly is cut into two segments with a certain inclination angle $\theta$. In practical use, it is desirable that this inclination angle $\theta$ be set to eight degrees.

Consequently, a pair of connector plugs for an optical connector can be obtained using the optical splicer prepared in accordance with the second embodiment of the present invention.

While the present invention has been described above with respect to two preferred embodiments thereof, it should of course be understood that the present invention should not be limited only to these embodiments but various change or modification may be made without departure from the scope of the present invention as defined by the appended claims.

What is claimed is:

1. An optical fiber splicer for splicing first and second ribbon-shaped optical fiber cords, each of said optical fiber cords including a sheathed portion wherein a sheath surrounds a plurality of optical fibers and a sheathless portion wherein the plurality of optical fibers project from said sheathed portion, comprising:

an aligning member including a base surface having a longitudinal axis therein;

first and second spaced end portions projecting from said base surface, said aligning member having a central axis located between said first and second end portions extending in a direction perpendicular to said base surface, and a transverse axis extending in a direction perpendicular to said longitudinal and central axes;

a concave surface symmetrically disposed with respect to said central axis extending in the direction of said longitudinal axis and spaced from said base surface, the distance between said concave surface and said base surface increasing gradually from the central axis toward said first and second end portions, said concave surface having a plurality of substantially V-shaped aligning grooves therein spaced from each other along said transverse axis and extending in the direction of said longitudinal axis;

first and second linear inclined surfaces interposed between said concave surface and said first and second end portions respectively, each of said linear inclined surfaces making a continuous and smooth transition from a bottom of each of said aligning grooves in said concave surface, the distance between each of said inclined surfaces and said base surface increasing linearly from said concave surface toward one of said first and second end portions, each of said inclined surfaces including a recessed sheath receiving portion extending in the directions of said longitudinal and transverse axes; and a pair of side plates spaced in the transverse direction and extending between said first and second end portions in the direction of said longitudinal axis; and a cover member adapted to be fitted into said aligning member for assembly therewith, said cover member including a top surface;

third and fourth spaced end portions projecting from said top surface;

a convex surface symmetrically disposed with respect to said central axis extending in the direction of said longitudinal axis, the distance between said convex surface and said top surface decreasing gradually from the central axis toward said third and fourth end portions, the curvature of said convex surface corresponding to that of the concave surface of said aligning member;

third and fourth linear inclined surfaces interposed between said convex surface and said third and fourth end portions respectively, each of said third and fourth linear inclined surfaces making a continuous and smooth transition with said convex surface, the distance between each of said third and fourth inclined surfaces and said top surface decreasing linearly from said convex surface toward one of said third and fourth end portions to correspond to said first and second linear inclined surfaces, each of said third and fourth inclined surfaces further including a recessed sheath receiving portion extending in the direction of said longitudinal and transverse axes and corresponding to the sheath receiving portions of said first and second linear inclined surfaces respectively; and a pair of flanges spaced in the direction of the transverse axis and extending between said third and fourth end portions in the directions of said longitudinal axis, the sheath receiving portions of said first and third linear inclined surfaces receiving the sheathed portion of said first optical fiber cords, the sheath receiving portions of said second and fourth linear inclined surfaces receiving the sheathed portion of said second optical fiber cords, and said V-shaped aligning grooves receiving the sheathless portions of said first and second optical fiber cords, whereby corresponding ends of said optical fibers are brought into optical contact with each other.

2. The optical fiber splicer according to claim 1, wherein said inclined surfaces of said aligning member and said inclined surfaces of said cover member have an inclination angle of ten degrees or less.

3. The optical fiber splicer according to claim 1, wherein said aligning member and said cover member are molded of a synthetic resin.

4. The optical fiber splicer according to claim 1 wherein, before the first and second ribbon-shaped optical fiber cords are inserted between said aligning member and said cover member, said sheaths of the first and second ribbon-shaped optical fiber cords, said sheathless optical fibers thereof and said substantially V-shapes aligning grooves of said aligning member are preliminarily coated with an adhesive.

5. The optical fiber splicer according to claim 5, wherein said adhesive is an ultraviolet ray hardening type adhesive having the same refractive index as that of each sheathless optical fiber.

6. The optical fiber splicer according to claim 5, wherein said ultraviolet ray hardening type adhesive is hardened by irradiating ultraviolet rays toward said adhesive from an ultraviolet ray lamp after both the ribbon-shaped optical fiber cords are inserted between said aligning member and said cover member.

7. An optical fiber splicer usable as connector plugs for an optical connector for ribbon-shaped optical fiber cords each including a plurality of optical fibers, comprising;

a first connector plug including a first aligning member half and a first cover member half, said first aligning member half for allowing sheathless optical fibers of a first ribbon-shaped optical fiber cord to be correctly aligned with sheathless optical fibers of a second ribbon-shaped optical fiber cord and including an inclined surface linearly extending from the insert side of said first ribbon-shaped optical fiber cord while having a gradually increased depth, a sheath receiving portion recessed across said inclined surface for receiving a sheath of said first ribbon-shaped optical fiber cord therein, a concave surface half extending subsequent to said inclined surface to reach the exposed end of said first aligning member half, a plurality of substantially V-shaped aligning grooves formed across said concave surface half for receiving said sheathless optical fibers of said first ribbon-shaped optical fiber cord therein in such a manner as to allow the foremost end faces of said sheathless optical fibers of said first ribbon-shaped optical fiber cord to be exposed to the outside, and side plates located on the opposite sides of said first aligning member half as seen in the transverse direction.

said first cover member half adapted to be firmly fitted into said first aligning member half for firmly holding said sheathless optical fibers of said first ribbon-shaped optical fiber cord in cooperation with said first aligning member half and including an inclined surface linearly extending from the insert side of said first ribbon-shaped optical fiber corresponding to said inclined surface of said first aligning member half, a sheath receiving portion recessed across said inclined surface corresponding to said sheath receiving portion of said first aligning member half for receiving said sheath of said first ribbon-shaped optical fiber cord therein, a convex surface half formed subsequent to said inclined surface corresponding to said convex surface half of said first aligning member half to reach the exposed end of said first cover member half, and flanges located on the opposite sides of said first cover member half as seen in the transverse direction, said first aligning member half and said first cover member half being firmly assembled with each other, a second connector plug including a second aligning member half and a second cover member half, said second aligning member half for allowing sheathless optical fibers of a second ribbon-shaped optical fiber cord to be correctly aligned with said sheathless optical fibers of said first ribbon-shaped optical fiber cord and including an inclined surface linearly extending from the insert end of said second ribbon-shaped optical fiber cord while having a gradually increased depth, a sheath receiving portion recessed across said inclined surface for receiving a sheath of said second ribbon-shaped optical fiber cord therein, a concave surface half extending subsequent to said inclined surface to reach the exposed end of said second aligning member half, a plurality of substantially V-shaped aligning grooves formed across said concave surface half for receiving said sheathless optical fibers of said second ribbon-shaped optical fiber cord therein in such a manner as to allow the foremost end faces of said sheathless optical fibers of said second ribbon-shaped optical fiber cord to be exposed to the outside, and side plates located on the opposite sides of said second aligning member half as seen in the transverse direction, said second cover member half adapted to be fitted into said second aligning member half for firmly holding said sheathless optical fibers of said second ribbon-shaped optical fiber cord in cooperation with said second aligning member half and including an inclined surface linearly extending from the insert end of said second ribbon-shaped optical fiber cord corresponding to said inclined surface of said second aligning member half, a sheath receiving portion formed across said inclined surface corresponding to said sheath receiving portion of said second aligning member half for receiving said sheath of said second ribbon-shaped optical fiber cord therein, a convex surface half formed subsequent to said inclined surface corresponding to said concave surface half of said second aligning member half to reach the exposed end of said second cover member half, and flanges located on the opposite sides of said second cover member half as seen in the transverse direction, and said second aligning member half and said second cover member half being firmly assembled with each other.

8. The optical fiber splicer according to claim 7, wherein said inclined surfaces of said first and second aligning member halves and said inclined surfaces of said first and second cover member halves have an inclination angle of ten degrees or less.

9. The optical fiber splicer according to claim 7, wherein said first and second aligning member halves and said first and second cover member halves are molded of a synthetic resin by employing an injection molding process.

10. The optical fiber splicer according to claim 7, wherein before said sheathless optical fibers of said first and second ribbon-shaped optical fiber cords are received in said substantially V-shaped aligning grooves, the foremost end faces of the respective sheathless optical fibers are integrally connected to each other by fusing them by employing an electrical discharging process.

11. The optical fiber splicer according to claim 7, wherein before said sheathless optical fibers of said first and second ribbon-shaped optical fiber cords are received in said substantially V-shaped aligning grooves, said sheaths of said first and second ribbon-shaped optical fiber cords, said sheathless optical fibers of the same and said substantially V-shaped aligning grooves of said first and second aligning member halves are preliminary coated with an adhesive.

12. The optical fiber splicer according to claim 11, wherein said adhesive is an ultraviolet ray hardening type adhesive having the same refractive index as that of each sheathless optical fiber.

13. The optical fiber splicer according to claim 12, wherein said ultraviolet ray hardening adhesive is hardened by irradiating ultraviolet rays toward said adhesive from an ultraviolet ray lamp, after said first and second ribbon-shaped optical fiber cords are held between said first and second aligning member halves and said first and second cover member halves.

14. The optical fiber splicer according to claim 7, wherein after said adhesive is hardened, a product of optical fiber splicer is cut into two segments at the central part at a substantially right angle relative to an optical axis of said optical fiber splicer wherein one of said two segments is used as a first connector plug and the other one is used as a second connector plug.

15. The optical fiber splicer according to claim 7, wherein after said adhesive is hardened, a product of optical fiber splice is cut into two segments at the central part thereof at a predetermined inclination angle relative to said otpical axis of said optical fiber splicer wherein one of said two segments is used as a first connector plug and the other one is used as a second connector plug.

16. The optical fiber splicer according to claim 15, wherein said inclination angle is set to eight degrees or less.

* * * * *